Sept. 25, 1928.  E. WILDHABER  1,685,441

METHOD OF PRODUCING GEARS

Filed Feb. 28, 1927   2 Sheets-Sheet 1

INVENTOR
Ernest Wildhaber
BY
ATTORNEY

Sept. 25, 1928.                E. WILDHABER                 1,685,441
                            METHOD OF PRODUCING GEARS
                            Filed Feb. 28, 1927          2 Sheets-Sheet 2

INVENTOR
*Ernest Wildhaber*
BY
ATTORNEY

Patented Sept. 25, 1928.

1,685,441

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

METHOD OF PRODUCING GEARS.

Application filed February 28, 1927. Serial No. 171,607.

The present invention relates to a method of producing bevel gears and particularly to a method of producing gears provided with longitudinally curved teeth.

The primary object of this invention is to provide a method of producing bevel gear pairs of large ratios, in which the tooth surfaces of each member may be cut two sides simultaneously without producing "bias bearing" when the gears run together, and to overcome limitations of my former inventions relating to the same purpose.

A further object of this invention is to provide a method for cutting bevel gears in which the tooth surfaces of each member may be cut two sides simultaneously, in such manner that the teeth taper in depth along their length in proportion to the taper of the gear itself with the tooth bottoms running substantially to the gear apexes, so that the gears are just as strong as gears whose tooth surfaces are cut one side at a time.

A further object of this invention is to permit of cutting both members of a pair of bevel gears two sides simultaneously with any desired spiral angle.

A further object of this invention is to provide a method for cutting bevel gears whereby the tooth profiles of opposite sides of the teeth may be differently curved by any desirable amount, while cutting two sides simultaneously, so as to get a desirable tooth bearing between the mating gears.

Other objects of the invention will be apparent hereinafter from the specification and from the recital of the appended claims.

In the accompanying drawings, I have illustrated the preferred method of producing a bevel gear pair according to this invention and one modification thereof. It will be understood, however, that the invention is capable of further modification within its scope and within the limits of the accompanying claims.

In practicing this invention, the pinion or smaller member of the pair, is preferably cut in the manner disclosed in my prior copending application No. 89,479, filed February 19, 1926, namely, by using a cutting tool whose pressure angle is greater than the pressure angle of the tooth side to be cut and rotating this tool in engagement with the pinion blank while imparting a relative rolling motion between the tool and blank in which the blank rolls as with a cone larger than its pitch cone on the pitch surface of the basic gear represented by the tool. The gear, or larger member of the pair, is cut, preferably, with a tool, having the same pressure angle as that of the tooth side to be cut on the blank, in a generating operation in which the tool and blank are moved relatively to each other as though the blank were meshing with a basic gear, represented by the tool, whose axis is offset from the axis of the blank. In the generation of the gear, the blank rolls with its pitch surface on the pitch surface of the basic gear, which the tool represents.

By producing the two members of a pair in the manner described, it has been found that their tooth surfaces can be cut two sides simultaneously and that the gears may be provided with bottoms which run toward their apexes and that the gears will mesh together without "bias bearing". The present invention, hence, provides a method for speeding up the production of bevel gears while, at the same time, providing gears which will run together in a most satisfactory manner.

This invention is applicable to the production of bevel gears having straight teeth, but is especially suited for the cutting of spiral bevel gears, that is bevel gears having longitudinally curved teeth.

With the present invention it is possible to cut gear pairs of large ratios practically and with theoretical correctness in a "duplex" operation, that is, in a method in which the side faces of each member are cut two sides simultaneously. The present invention hence, avoids a limitation of the method of my prior application mentioned. The present invention can be employed, moreover, where the tooth number of the crown gear is small, a characteristic practical improvement of the prior application mentioned.

Figure 1:
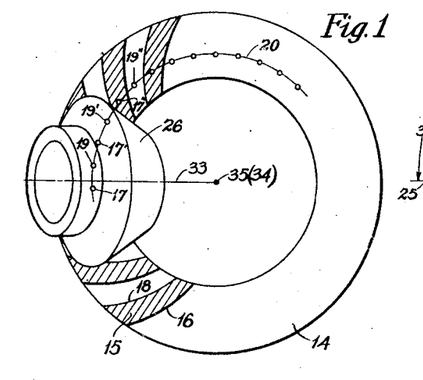
Figure 1 is a plan view, illustrating diagrammatically the preferred method of producing a pinion according to this invention.
Figure 2:
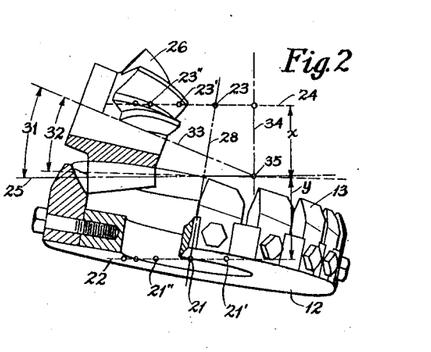
Figure 2 is a side elevational view further illustrative of the preferred method of producing the pinion.
Figures 3, 4, 5, 6:
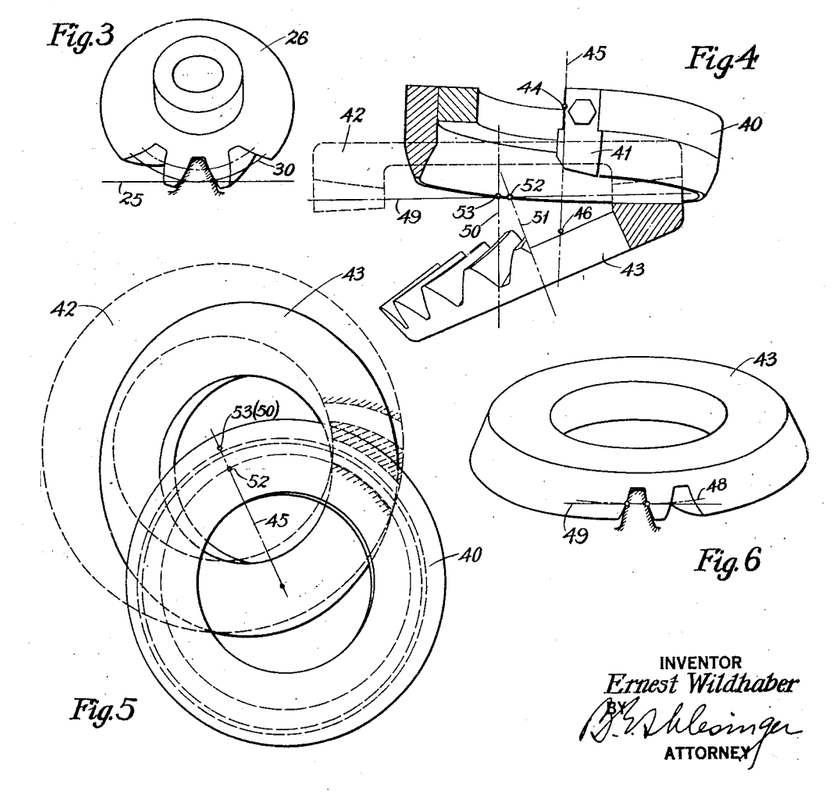
Figure 3 is an end elevation showing, somewhat diagrammatically, the preferred method of applying the generating roll in producing the pinion.
Figures 4 and 5 are a side elevation and plan view, respectively, illustrating the preferred method of producing the gear or larger member of the pair with this invention.
Figure 6 is an end view corresponding to Figure 3 and illustrating diagrammatically the manner of rolling the gear and tool relatively to each other to generate the tooth profiles of the gear.

As has been pointed out in my prior application No. 89,479, already referred to, it is possible to cut bevel gears two sides simultaneously with teeth of tapering depth and with tooth bottoms which run substantially to the apex by employing a cutter whose cutting edges are of greater pressure angle that the tooth surfaces to be cut thereby and by rolling this cutter and the blank relatively to each other as though a cone larger than the pitch cone of the blank were rolling on the pitch surface of the gear which the tool represents. This method of cutting gears is employed, preferably, in cutting the pinion or smaller member of a pair with the present invention. This method of cutting is illustrated in Figures 1, 2 and 3.

12 indicates a cutter which is in the form of a rotary annular face mill and which is provided with a plurality of cutting blades 13. The cutting blades 13 may, each of them, have two side finish cutting edges, or may be so arranged that alternate blades are provided with cutting edges for finish cutting opposite sides of the teeth. The cutting edges of the tool 12 represents side tooth surfaces of a basic gear 14 which in the preferred embodiment of this invention is provided with teeth 15 whose side surfaces are portions of spherical surfaces of revolution. The convex pitch lines 16 of the teeth of the crown gear 14 are arcs of circles whose centers are at 17, 17', 17'' etc. while the concave pitch lines 18 are arcs of circles whose centers are at 19, 19', 19'' etc. The centers 17, 17', 17'' and 19, 19', 19'' etc. all lie on the same circle 20. The convex tooth surfaces, themselves, are parts of convex spherical surfaces whose sphere centers 21, 21', 21'' etc. lie on a circle 22, which projects as a straight line in Figure 2, which is situated below the pitch plane 23 of the crown gear. The concave tooth surfaces are, likewise, parts of concave spherical surfaces whose centers 23, 23', 23'', etc. lie on a circle 24 which is situated above the pitch plane 25 of the crown gear. For theoretically correct gearing, the distance $x$ of the circle 24 above the pitch plane 25 should be the same as the distance $y$ of the circle 22 below that plane. With this invention, the pinion or smaller member of the pair, is preferably produced conjugate to a crown gear, such as 14, the pressure angles of whose tooth sides are larger than the pressure angles of the tooth sides to be produced on the pinion.

The crown gear is represented by the tool 12, whose finish cutting edges have pressure angles larger than the pressure angles of the tooth sides to be cut thereby. The pressure angle of a cutting edge, as here understood, is equal to half the angle included between opposite side finish cutting edges.

To produce two side faces of the pinion blank 26 simultaneously and conjugate to the crown gear 14, the tool 12 must be so positioned that its axis 28 passes through the center 21 of a convex spherical tooth surface of the crown gear and also through the center 23 of a concave spherical tooth surface of the crown gear. In other words, the outside and inside finish cutting edges of the blades 12 of the tool must be respectively, portions of convex and concave spherical surfaces whose centers 21 and 23 are located on the tool axis 28 and which are of the same radius, respectively, as are the convex and concave tooth sides 16 and 18 respectively, of the crown gear teeth 15.

The tooth surfaces of the pinion are generated by rolling the blank with a surface other than its pitch surface, and preferably of greater dimension than its pitch surface, on the pitch surface of the basic gear which the tool represents. This method is different from that ordinarily employed in generating bevel gears, for bevel gears are ordinarily generated in a rolling operation in which the pitch surface of the blank rolls on the pitch surface of the basic gear which the tool represents.

The tool 12, then is rotated on its axis in engagement with the pinion blank 26 and the blank and tool are rolled relatively to each other as though a conical surface 30 of the blank, whose cone angle 31 is greater than the pitch cone angle 32 of the blank, were rolling on the pitch surface 25 of the crown gear 14 which the tool represents. In the rolling motion, the blank 26 is rotated on its axis 33 and simultaneously an additional relative movement is imparted between the tool and blank about an axis 34 representing the axis of the crown gear 14 and intersecting the blank axis 33 in the blank apex 35.

In the manner described, two tooth surfaces of the pinion blank 26 are cut simultaneously. The blank is then indexed and the operation proceeds as before.

The gear, or larger member of the pair, is cut in a different kind of operation, in which the tool represents a crown gear whose axis is offset from the axis of the blank. This is again different from the usual methods of generating bevel gears, since, ordinarily, the blank is rolled as on a crown gear or basic gear whose axis intersects the blank axis in its apex.

The tool for cutting the gear is shown at 40. It is provided with cutting blades 41 whose side finish cutting edges are of spherical profile, representing side tooth surfaces of the crown gear 42, with which the gear blank 43 is rolled during generation. The pressure angles of both inside and outside finish cutting edges of the tool are the same as the pressure angles of the tooth surfaces of the gear blank 43 to be cut thereby. The outside finish cutting edges of the blade 41 are portions of a convex spherical surface whose center is at 44 on the axis 45 of the tool, while the inside finish cutting edges of the blades 41 are portions of a concave spherical surface whose center is at 46 upon the axis 45 of the tool. The tool thus represents a pair of adjacent side tooth surfaces of the crown gear 42 whose centers are at 44 and 46 respectively. Preferably, the sphere radius of the outside finish cutting edges of the tool 40 is the same as the sphere radius of the inside cutting edges of the tool 12, while the sphere radius of the inside cutting edges of the tool 40 is the same as the sphere radius of the outside cutting edges of the tool 12. The tool 12, will, accordingly, be smaller in diameter than the tool 40. If no mismatch is desired, the sphere radii of outside and inside cutting edges will be made equal.

In the generation of the gear, the tool 40 is rotated on its axis 45 in engagement with the blank 43, while a relative rolling movement is imparted between the tool 40 and blank 43 as though the blank 43 were rolling with its pitch surface 48 on the pitch plane 49 of the crown gear 42 whose axis 50 is offset from, that is, non-intersecting and non-parallel to, the axis 51 of the blank 43. In this rolling movement, the blank 51 is rotated on its axis and the tool and blank moved relatively to each other about the axis 50 of the crown gear. After two tooth sides of the blank 43 have been cut, the tool and blank are withdrawn relatively to each other and the blank indexed.

A gear 43 and a pinion 26 cut in the manner described will mesh together with their axes 51 and 33 angularly disposed and intersecting and with their apexes 35 and 52 coinciding, as do bevel gears cut according to other methods, and they will transmit true uniform motion.

The manner in which the amount of offset between the crown gear axis 50 and the blank axis 51 is determined will be described below, referring particularly to Figures 8 and 9. These figures are diagrammatic views, in plan, of the pitch plane of the crown gear 42. The crown gear apex or center is indicated at 53. The blank is assumed to be so in mesh with the crown gear that its axis projects into the line 51'. 55 and 56 are pitch line elements of opposite side faces of a tooth of the crown gear or a tooth space of the gear 43 generated conjugate thereto. The sphere centers of the tooth sides having the pitch line elements 55 and 56 are at 44' and 46' respectively on the projected cutter axis 45'. P indicates a mean point of contact between the crown gear tooth and the tooth space of the gear 43. When the crown gear and gear have rolled together far enough so that contact between the two takes place at the point P the sphere center 46' will have moved to C which is, accordingly, the center of the spherical tooth surface of the crown gear when tooth contact takes place at P.

The line of contact between the tooth surfaces of the gear and crown gear at any considered moment, depends on the relative path of the sphere center C with respect to the blank. More accurately speaking, the location of said line of contact depends solely upon the location of the tangent to said relative path, at the considered instant.

This tangent or the direction of relative motion, remains the same, whether the basic tooth surface whose center is at C is turned about 52 or about any other axis 50 or 50' as long as such axis is located on the line 57 connecting the apex 52 of the blank with the center C of tooth curvature, and as long as the turning motion about axis 50 or 50' is such as to move center C to the same infinitely close position C', as does a turning motion about 52. In other words, if the distance from the blank apex 52 to the center C is equal to R and the distance from blank apex 52 to the crown gear axis 50 is equal to $x$ (distance 52—50' = —x) the angle of rotation $\phi_1$ about axis 50 and the angle of rotation $\phi$ about the apex 52 are in the following relation:

$$R\phi = (R+x)\phi_1.$$

We may use, therefore, as the basic gear for producing the larger member of the pair, any crown gear having a center 53 or 53' located on the line 57 and still obtain the same lines of contact between the teeth of the crown gear and gear being cut at the central position P, as would be obtained were the gear rolled on a basic crown gear whose axis intersects the blank axis in the blank apex 52.

While the lines of contact between the gear and crown gear remain the same, regardless of the position of the crown gear center on the line 57, generally speaking, the tooth curvatures do not. The tooth curvature of the gear teeth is affected by the location of the crown gear center on the line 57.

Figures 8, 9, 10:
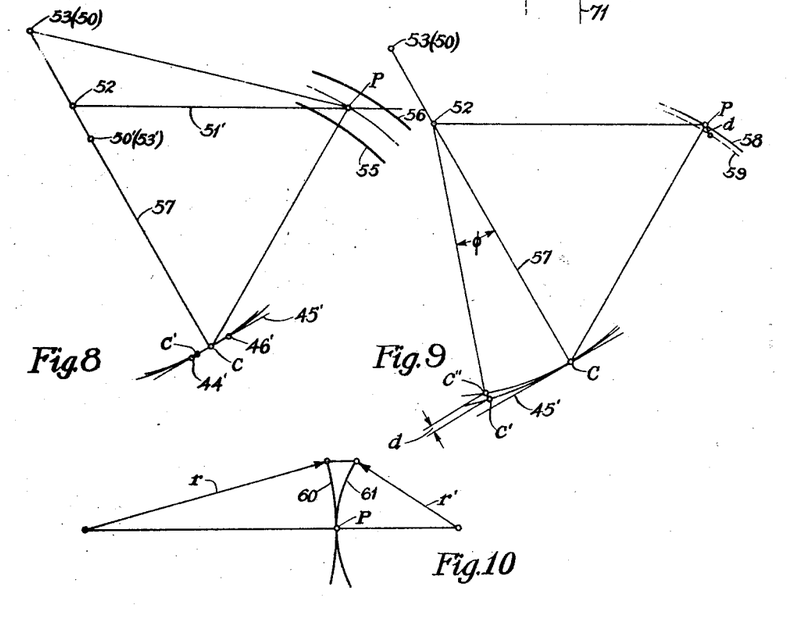
Figures 8 and 9 are diagrammatic views further illustrative of the method of producing the gear or larger member of the pair.
Figures 10 and 11 are diagrammatic views illustrating how the tooth profile of the gear may be modified by the method disclosed diagrammatically in Figure 8 and 9.
Figure 11:
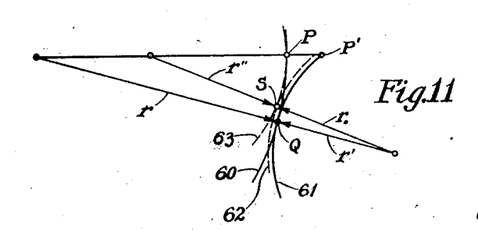

This will be clear from Figures 9, 10 and

11. When the center C of tooth curvature is turned about an axis 50 which is offset from the blank apex 52, instead of being turned about an axis which intersects the blank axis, as is the usual practise in cutting bevel gears, the center C will move to C' instead of to C'', and if the turning angles $\phi$ and $\phi_1$ are in the relation given above, the center of tooth curvature, as a result of the present method of cutting, will be displaced, as compared with prior methods, by a distance $d$ in a direction parallel to the line 57. The crown gear tooth profile will also be displaced by the same amount $d$ as indicated in dotted lines at 59, over the position 58 which it would occupy, were the axis of the crown gear intersecting the axis of the blank in its apex 52.

In Figure 10, the circumferential tooth profiles 60 and 61 of a gear and crown gear are shown, when contact takes place between these two tooth profiles at the mean contact point P. $r$ represents the curvature radius of the gear profile and $r'$ designates the curvature radius of the crown gear tooth profile, that is, the curvature radius of the cutter. For the mean contact position P, the relative position of the gear and crown gear tooth profiles will be the same, whether the axis of the crown gear intersects the axis of the blank in its apex or whether the axis of the crown gear be offset from the axis of the blank, as is the case in cutting the larger member of the pair according to the present invention.

In Figure 11, the heavy lines 60 and 61 indicate the position of gear and crown gear tooth profiles, when the crown gear axis intersects the axis of the blank, after they have rolled from the position P to a position where contact between these profiles takes place at the point Q. The distances PQ and P'Q are of the same length on the two profiles 60 and 61, because in the immediate vicinity of the pitch surface, that is, in the immediate vicinity of the point P the profiles of bevel gears roll without sliding. As has been explained, however, the profile of an offset crown gear will not have the same position, after some rolling movement has taken place, as has the profile of a crown gear whose axis intersects the axis of the blank in its apex. On the contrary, the profile of the tooth of an offset crown gear will be advanced or withdrawn compared to the position which the profile of a crown gear, having an intersecting axis, would occupy, depending on the tooth side under consideration. An advanced position 62 of the tooth profile is shown in Figure 11. As a result of the displacement of the tooth profile of the crown gear tooth over the position it would occupy were the crown gear axis intersecting the axis of the blank, the crown gear tooth profile 62, which is represented by the cutting blade of the tool, will envelop or sweep out a profile 63 on the gear being cut, whose curvature radius $r''$ is different from $r$. In the position shown in Figure 11, actual contact will take place between the gear tooth and the cutting tool, crown gear tooth, at S and not at Q, as would be the case were the axis of the crown gear intersecting the axis of the blank. As the profile of the crown gear tooth, namely, the cutter, and its radius $r_0$, is predetermined, the profile of the gear tooth will be modified over that which would be produced with the usual heretofore practised method of cutting bevel gears. The new gear tooth profile will pass simultaneously through S and P. By varying the positions of the crown gear center 50 along the line 57, therefore, it is possible to change or modify the tooth profile curvature of the gear teeth being cut. The amount of modification which it is possible to obtain from different positions of the crown gear center or apex, can be calculated from the known methods of descriptive geometry.

Figures 10 and 11 refer to only one tooth profile of the gear. The tooth profile of the opposite side of the gear tooth will be less curved when the blank is cut in a generating operation in which the crown gear axis is offset from the axis of the blank, than when derived from a basic crown gear whose axis passes through the blank apex, inasmuch as the cutting surface of the offset crown gear is advanced for one tooth side and withdrawn for the other tooth side over the position it would occupy when the axis of the crown gear passes through the blank apex.

In Figure 11 the tool profile (crown gear tooth profile) which is advanced over the usual position, is shown convex for convenience. Ordinarily, in cutting the gear according to this invention, the concave profile of the spherical cutter will be advanced while the convex profile will recede.

The correction obtained by curving one side of the teeth of the gear more and the other side less than with previous methods of cutting is desirable because the pinion is produced with a tool of increased pressure angle. With a pinion produced in this way, the profile curvature of the pinion teeth will be somewhat too large on one side and somewhat too small on the other side, generally. The method of producing the gears described herein permits of compensating for this characteristic of the pinion teeth.

With the present invention, it is preferable but not necessary to employ a true crown gear as the basic element from which the tooth profiles are to be generated. The tool and blank may be rolled relatively to each other as though the blank were rolling upon the pitch surface of a nominal crown gear, that is, a crown gear whose top surface is a plane and whose pitch surface is a cone. The basic member, which the tool represents, may be, in fact, any suitable form of basic gear.

Figure 7:
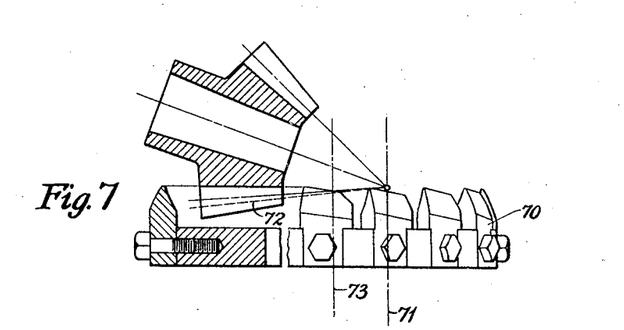
Figure 7 is a side elevational view illustrating a modified method of producing gears with this invention.

In Figure 7 the tool 70 is shown in position to represent a nominal crown gear whose axis is at 71 and whose pitch surface is indicated at 72. The axis 73 of the tool is here arranged parallel to the axis 71 of the crown gear. In the case of a pinion blank, as before, the blades of the tool will be of increased pressure angle and the blank will roll upon some surface outside its pitch surface. The cutting of a pinion conjugate to a nominal crown gear is illustrated in Figure 7. The mating gear may be cut conjugate to a nominal crown gear also, but preferably will be cut, as before, conjugate to a true crown gear.

While the present invention has been described particularly with reference to tools having cutting edges of circular arc profile, representing spherical tooth surfaces of a basic gear, it will be understood that the tools may be of any other suitable profile, also, as straight sided.

While it is preferred to use the method, herein disclosed, of cutting a gear in conjunction with the method of cutting a pinion described in my application No. 89,479 and shown in Figures 1, 2 and 3 of the present application, it is also possible to cut both members of a pair of bevel gears, two tooth sides simultaneously, where both members are cut from offset crown gears according to the principles shown in Figures 4, 5, 6 and 8 to 11 inclusive.

While I have illustrated certain preferred embodiments of my invention, it will be understood that this invention is capable of further modification within the limits of the disclosure and the scope of the appended claims and that this application is intended to cover any variations, uses, or adaptations of my invention, following, in general, the principles of the invention and including such departures from the present disclosure as come within known or customary practice in the gear art and as may be applied to the essential features hereinbefore set forth and as fall within the limits of the accompanying claims.

Having thus described my invention, what I claim is:

1. The method of producing a pair of bevel gears which consists in generating the side tooth surfaces of one member of the pair two sides simultaneously, by moving a pair of cutting edges in concentric curved paths across the face of a tapered gear blank, while imparting a relative rolling movement between said cutting edges and the blank in the manner of a gear rolling on a crown gear whose axis intersects the axis of the blank in its apex, and generating the side tooth surfaces of the other member two sides simultaneously by moving a pair of cutting edges in concentric curved paths across the face of a tapered gear blank while imparting a relative rolling movement between said tools and blank in the manner of a gear meshing with a crown gear, whose axis is offset from the blank axis.

2. The method of producing a pair of bevel gears which consists in generating the side tooth surfaces of one member of the pair two sides simultaneously, by moving a pair of cutting edges in concentric curved paths across the face of a tapered gear blank while rotating the blank on its axis and simultaneously imparting an additional relative movement between the cutting edges and blank about an axis intersecting the blank axis in its apex, and in generating the side tooth surfaces of the other member of the pair two sides simultaneously by moving a pair of cutting edges in concentric curved paths across the face of a tapered gear blank while rotating the blank on its axis and simultaneously imparting an additional relative movement between the cutting edges and blank about an axis offset from the blank axis.

3. The method of producing a pair of bevel gears which consists in cutting the side tooth surfaces of one member of the pair by moving a cutting edge, having a pressure angle the same as the pressure angle of the tooth side to be cut thereby, across the face of a tapered gear blank while imparting a relative generating movement between the cutting edge and blank in which the cutting edge and blank are moved relatively to each other in the manner of a gear moving with its pitch surface on the pitch surface of a crown gear whose axis is offset from the axis of the blank, and in cutting the side tooth surfaces of the other member of the pair by moving a cutting edge, having a pressure angle greater than the pressure angle of the tooth side to be cut thereby, across the face of a tapered gear blank while imparting a relative rolling movement between said latter cutting edge and blank as though a cone of greater dimension than the pitch cone of the blank were rolling on the pitch surface of a crown gear, whose axis intersects the axis of the blank in its apex.

4. The method of producing a pair of bevel gears which consists in cutting the side tooth surfaces of one member of the pair by moving a cutting edge, having a pressure angle the same as the pressure angle of the tooth side to be cut thereby, in a curved path across the face of a tapered gear blank while imparting a relative movement between said cutting edge and blank in the manner of a gear moving with its pitch surface on the pitch surface of a crown gear whose axis is offset from the axis of the blank, and in cutting the side tooth surfaces of the other member of the pair by moving a cutting edge, having a pressure angle greater than the pressure angle of the tooth side to be cut thereby, in a curved path across the face of a tapered gear blank while imparting a relative rolling movement between said latter cutting edge and blank as though a cone of greater dimension than the pitch cone of the blank were rolling on the pitch surface of a crown gear whose axis intersects the blank axis in its apex.

5. The method of producing a pair of bevel gears which consists in cutting a side tooth surface of one member of the pair by moving a cutting edge, whose pressure angle is greater than the pressure angle of the tooth side to be cut thereby, across the face of a tapered gear blank while imparting a relative rolling movement between the cutting edge and blank in the manner of a cone of greater dimension than the pitch cone of the blank rolling on the pitch surface of a basic gear represented by the tool, and in cutting the side tooth surfaces of the other member of the pair by moving a cutting edge across the face of a tapered gear blank while imparting a relative movement between the cutting edge and blank in the manner of a gear meshing with a basic gear, represented by the latter cutting edge, whose axis is offset from the axis of the blank.

6. The method of producing a pair of bevel gears which consists in cutting the side tooth surfaces of one member of the pair by moving a cutting edge whose pressure angle is greater than the pressure angle of the tooth side to be cut thereby in a curved path across the face of a tapered gear blank while imparting a relative rolling movement between the cutting edge and blank in the manner of a cone of greater dimension than the pitch cone of the blank rolling on the pitch surface of a basic gear represented by the cutting edge and in cutting the side tooth surfaces of the other member of the pair by moving a cutting edge in a curved path across the face of a tapered gear blank while imparting a relative movement between the latter cutting edge and blank in the manner of a gear meshing with a basic gear, represented by the cutting edge, whose axis is offset from the blank axis.

7. The method of producing a pair of bevel gears which consists in cutting the side tooth surfaces of one member of the pair by moving a cutting edge, having a pressure angle the same as the pressure angle of the tooth side to be cut thereby, across the face of a tapered gear blank while imparting a relative movement between the cutting edge and blank as though the blank were moving with its pitch cone on the pitch surface of a basic gear, represented by the tool, whose axis is offset from the axis of the blank, and in cutting the side tooth surfaces of the other member of the pair by moving a cutting edge, whose pressure angle is greater than the pressure angle of the tooth to be cut thereby, across the face of a tapered gear blank while imparting a relative rolling movement between the latter cutting edge and blank as though a cone of greater dimension than the pitch cone of the blank were rolling on the pitch surface of a basic gear, represented by the latter cutting edge, whose axis intersects the blank axis in its apex.

8. The method of producing a pair of bevel gears, which consists in cutting the side tooth surfaces of one member of the pair by moving a cutting edge, having a pressure angle the same as the pressure angle of the tooth side to be cut thereby, in a curved path across the face of a tapered gear blank while imparting a relative movement between the cutting edge and blank as though the blank were moving with its pitch cone on the pitch surface of a basic gear, represented by the cutting edge, whose axis is offset from the axis of the blank, and in cutting the side tooth surfaces of the other member of the pair by moving a cutting edge, having a pressure angle greater than the pressure angle of the tooth side to be cut thereby in a curved path across the face of a tapered gear blank while imparting a relative rolling movement between the latter cutting edge and blank as though a cone of greater dimension than the pitch cone of the blank were rolling on the pitch surface of a basic gear, represented by the latter cutting edge, whose axis intersects the blank axis in its apex.

9. The method of producing a pair of bevel gears, which consists in cutting the side tooth surfaces of one member of the pair two sides simultaneously by moving a pair of cutting edges, having pressure angles equal to the pressure angles of the tooth surfaces to be cut thereby, across the face of a tapered gear blank while imparting a relative movement between the cutting edges and blank in the manner of a gear meshing with a basic gear, represented by the cutting edges, whose axis is offset from the axis of the blank, and in cutting the side tooth surfaces of the other member of the pair two sides simultaneously by moving a pair of cutting edges, whose pressure angles are greater than the pressure angles of the tooth sides to be cut thereby, across the face of a tapered gear blank while imparting a relative rolling movement between the latter cutting edges and blank in the manner of a cone of greater dimension than the pitch cone of the blank rolling on the pitch surface of a basic gear, represented by the latter cutting edges, whose axis intersects the axis of the blank in its apex.

10. The method of producing a pair of bevel gears which consists in cutting the side tooth surfaces of one member of the pair two sides simultaneously by moving a pair of cutting edges, having pressure angles equal to the pressure angles of the tooth surfaces to be cut thereby, in concentrically curved paths across the face of a tapered gear blank while imparting a relative movement between the cutting edges and blank in the manner of a gear moving with its pitch surface on the pitch surface of a basic gear, represented by the cutting edges, whose axis is offset from the axis of the blank, and in cutting the side tooth surfaces of the other member of the pair two sides simultaneously by moving a pair of cutting edges, having pressure angles greater than the pressure angles of the tooth sides to be cut thereby, in concentrically curved paths across the face of a tapered gear blank while imparting a relative rolling movement between the latter cutting edges and blank in the manner of a cone of greater dimension than the pitch cone of the blank rolling on the pitch surface of a basic gear, represented by the latter cutting edges, whose axis intersects the axis of the blank in its apex.

11. The method of producing a pair of bevel gears which consists in cutting the side tooth surfaces of one member of the pair two sides simultaneously by moving a pair of cutting edges, whose pressure angles are greater than the pressure angles of the tooth sides to be cut thereby, across the face of a tapered gear blank while imparting a relative rolling movement between the cutting edges and blank in the manner of a cone of greater dimension than the pitch cone of the blank rolling on the pitch surface of a basic gear, represented by the cutting edges, and in cutting the side tooth surfaces of the other member of the pair two sides simultaneously by moving a pair of cutting edges across the face of a tapered gear blank while imparting a relative rolling movement between the latter cutting edges and blank in the manner of a gear meshing with a basic gear, represented by the latter cutting edges, whose axis is offset from the blank axis.

12. The method of producing a pair of bevel gears which consists in cutting the side tooth surfaces of one member of the pair two sides simultaneously by moving a pair of cutting edges, having pressure angles greater than the pressure angles of the tooth sides to be cut thereby, in concentrically curved paths across the face of a tapered gear blank while imparting a relative rolling movement between the cutting edges and blank in the manner of a cone of greater dimension than the pitch cone of the blank rolling on the pitch surface of a basic gear, represented by the cutting edges, and in cutting the side tooth surfaces of the other member of the pair, by moving a pair of cutting edges in concentrically curved paths across the face of a tapered gear blank while imparting a relative movement between the cutting edges and blank in the manner of a gear meshing with a basic gear, represented by the latter cutting edges, whose axis is offset from the blank axis.

13. The method of producing a pair of bevel gears which consists in cutting the side tooth surfaces of one member of the pair two sides simultaneously by selecting a rotary annular face mill, provided with cutting edges adapted to finish cut opposite side tooth faces of the blank, rotating the tool in engagement with a tapered gear blank to cut two side faces of the blank simultaneously and simultaneously imparting a relative movement between the tool and blank in the manner of a gear meshing with a basic gear, represented by the tool, whose axis is offset from the axis of the blank and in cutting the side tooth surfaces of the other member of the pair two sides simultaneously by selecting a rotary annular face mill, provided with cutting edges adapted to finish cut opposite side tooth faces of the blank, rotating said tool in engagement with a tapered gear blank and simultaneously imparting a relative rolling movement between the latter tool and blank in the manner of a gear rolling with a basic gear, represented by the latter tool, whose axis intersects the blank axis in its apex.

14. The method of producing a pair of bevel gears which consists in cutting the side tooth surfaces of one member of the pair two sides simultaneously by selecting a rotary annular face mill, provided with cutting edges adapted to finish cut opposite side tooth faces of the blank, rotating said tool in engagement with a tapered gear blank and simultaneously imparting a relative movement between the tool and blank in the manner of a gear moving with its pitch cone on the pitch surface of a basic gear, represented by the tool, whose axis is offset from the axis of the blank, and in cutting the side tooth surfaces of the other member of the pair two sides simultaneously by selecting a rotary annular face mill, provided with cutting edges adapted to finish cut opposite side tooth faces of the blank, said edges having pressure angles greater than the pressure angles of the tooth sides to be cut thereby, rotating the latter tool in engagement with a tapered gear blank and simultaneously imparting a relative rolling movement between the latter tool and blank as though a cone of greater dimension than the pitch cone of the blank were rolling on the pitch surface of a basic gear, represented by the latter tool, whose axis intersects the blank axis in its apex.

15. The method of producing a bevel gear conjugate to a basic crown gear having longitudinally curved teeth which consists in moving a tool across the face of a tapered gear blank in a path curved about a fixed center, representing a center of tooth curvature of the teeth of the crown gear, while imparting a relative rolling movement between the tool and blank in the manner of a gear rolling with the basic crown gear, in which the axis of the blank is offset from the axis of the crown gear, and the center of the crown gear lies on a line, in the pitch plane of the crown gear, connecting the apex of the blank and the center of tooth curvature.

16. The method of producing a bevel gear conjugate to a basic crown gear having teeth, the adjacent side faces of which are arranged in pairs curved longitudinally about the same center, which consists in moving a pair of cutting edges across the face of a tapered gear blank in paths curved longitudinally about the same center to cut two side faces of the blank simultaneously, while imparting a relative rolling movement between the cutting edges and blank in the manner of a gear rolling with the basic crown gear, in which the axis of the blank is offset from the axis of the crown gear and the center of the crown gear lies on a line, in the pitch surface of the crown gear, connecting the apex of the blank and the center of tooth curvature.

17. The method of producing a pair of bevel gears which consists in cutting the side tooth surfaces of one member of the pair two sides simultaneously by moving a pair of cutting edges, having pressure angles greater than the pressure angles of the tooth sides to be cut thereby, in concentrically curved paths across the face of a tapered gear blank while imparting a relative rolling movement between the cutting edges and blank in the manner of a cone of greater dimension than the pitch cone of the blank rolling on the pitch surface of a basic gear, represented by the cutting edges, whose axis intersects the axis of the blank in its apex, and in cutting the side tooth surfaces of the other member of the pair conjugate to a basic gear having longitudinally curved teeth whose side tooth surfaces are arranged in pairs curved longitudinally about the same center, by moving a pair of cutting edges in concentrically curved paths across the face of a tapered gear blank while imparting a relative movement between the latter cutting edges and blank in the manner of a gear meshing with the basic gear, represented by the cutting edges, while maintaining the axis of the blank offset from the axis of said basic gear and the apex of said basic gear on a line, in the pitch surface of the basic gear, connecting the apex of the blank and the center of tooth curvature of the basic gear.

18. The method of producing a pair of bevel gears which consists in cutting the side tooth surfaces of one member of the pair two sides simultaneously by employing an annular face mill, having cutting edges, adapted to cut opposite side tooth faces of the blank, whose pressure angles are greater than the pressure angles of the side tooth faces to be cut thereby, and rotating said tool in engagement with a tapered gear blank while imparting a relative rolling movement between the tool and blank in the manner of a cone of greater dimension than the pitch cone of the blank rolling on the pitch surface of a basic gear, represented by the tool, whose axis intersects the axis of the blank in its apex, and in cutting the side tooth surfaces of the other member of the pair two sides simultaneously so as to be conjugate to a basic gear having teeth, the adjacent side faces of which are arranged in pairs curved longitudinally about the same center, by rotating an annular face mill, having cutting edges adapted to cut opposite side tooth faces of the blank, in engagement with a tapered gear blank while imparting a relative movement between the latter tool and blank in the manner of a gear meshing with said latter basic gear, while maintaining the axis of the blank offset from the axis of the basic gear and the center of the basic gear on a line, in the pitch surface of the basic gear, connecting the apex of the blank with the center of tooth curvature of the basic gear.

19. The method of producing a pair of bevel gears which consists in cutting the side tooth surfaces of one member of the pair two sides simultaneously by moving a pair of cutting edges, of circular arc profile and having greater pressure angles than the pressure angles of the tooth faces to be cut thereby, in separate concentrically curved paths across the face of a tapered gear blank while imparting a relative rolling motion between the cutting edges and blank as though a cone of greater dimension than the pitch cone of the blank were rolling on the pitch surface of the basic gear represented by the cutting edges, and in cutting the side tooth faces of the other member of the pair two sides simultaneously by employing a pair of cutting edges, of circular arc profile whose radii are such that the cutting edge which cuts one side surface of the blank has the same radius as the cutting edge which cuts the mating tooth surface of the first gear, and moving said cutting edges in separate concentrically curved paths across the face of a tapered gear blank while imparting a relative movement between the latter cutting edges and blank in the manner of a gear meshing with a crown gear whose axis is offset from the axis of the blank.

20. The method of producing a pair of bevel gears which consists in cutting the side tooth surfaces of one member of the pair two sides simultaneously by employing a rotary annular face mill having cutting edges adapted to cut opposite side tooth faces of the blank which are of circular arc profile and of greater pressure angle than the pressure angle of the side tooth faces to be cut thereby, and rotating said tool in engagement with a tapered gear blank while imparting a relative rolling motion between the cutting edges and blank as though a cone of greater dimension than the pitch cone of the blank were rolling on the pitch surface of a basic gear, represented by the tool, whose axis intersects the axis of the blank in its apex, and in cutting the side tooth surfaces of the other member of the pair two sides simultaneously by employing a rotary annular face mill, having cutting edges of circular arc profile whose pressure angles are the same as the pressure angles of the tooth faces to be cut thereby and whose radii are such that the cutting edge which cuts one side surface of the blank has the same radius as the cutting edge of the first named tool which cuts the mating tooth surface of the first gear, and rotating said tool in engagement with a tapered gear blank while imparting a relative movement between the tool and blank in the manner of a gear meshing with a basic gear, represented by the tool, whose axis is offset from the axis of the blank.

21. The method of producing a pair of bevel gears, which consists in cutting the side tooth surfaces of one member of the pair two sides simultaneously by moving a pair of cutting edges in concentric curved paths across the face of a tapered gear blank, while imparting a relative generating movement between the cutting edges and blank, as though the blank were meshing with a basic gear represented by the cutting edges, and in cutting the side tooth surfaces of the other member of the pair two sides simultaneously by moving a pair of cutting edges, having pressure angles different from the pressure angles of the first pair of cutting edges, in concentric curved paths across the face of a tapered gear blank while imparting a relative generating movement between the latter cutting edges and blank, as though the blank were meshing with a basic gear represented by said cutting edges.

22. The method of producing a pair of bevel gears which consists in generating the side tooth surfaces of one member of the pair two sides simultaneously, by moving a pair of cutting edges in concentric curved paths across the face of a tapered gear blank while rotating the blank on its axis and simultaneously imparting an additional relative movement between the cutting edges and blank about an axis intersecting the blank axis in its apex, and in generating the side tooth surfaces of the other member of the pair two sides simultaneously by moving a pair of cutting edges, having pressure angles different from the pressure angles of the first pair of cutting edges, in concentric curved paths across the face of a tapered gear blank while rotating the blank on its axis and simultaneously imparting an additional relative movement between the latter cutting edges and blank about an axis offset from the blank axis.

23. The method of producing a pair of bevel gears which consists in generating the side tooth surfaces of one member of the pair two sides simultaneously by moving a pair of cutting edges in concentric curved paths across the face of a tapered gear blank while imparting a relative rolling movement between the cutting edges and blank in the manner of a gear meshing with a basic crown gear whose axis intersects the blank axis in its apex, and in generating the side tooth surfaces of the other member of the pair two sides simultaneously by moving a pair of cutting edges, having pressure angles different from the pressure angles of the first pair of cutting edges, in concentric curved paths across the face of a tapered gear blank while imparting a relative movement between the latter cutting edges and blank corresponding to that of a gear meshing with a basic crown gear whose axis is offset from the axis of the blank.

24. The method of producing a pair of bevel gears which consists in cutting the side tooth surfaces of one member of the pair with a rotary annular face mill, provided with cutting edges adapted to finish cut opposite side tooth faces of the blank, while rotating said tool in engagement with a tapered gear blank and imparting a relative generating movement between the tool and blank as though the blank were meshing with a basic gear represented by the tool, and in cutting the side tooth faces of the other member of the pair with a rotary annular face mill, having a different diameter from the first tool, by rotating the latter tool in engagement with a tapered gear blank while imparting a relative generating movement between the latter tool and blank as though the blank were meshing with a basic gear represented by the latter tool.

25. The method of producing a pair of bevel gears which consists in cutting the side tooth surfaces of one member of the pair with a rotary annular face mill, provided with cutting edges adapted to finish cut opposite side tooth faces of the blank, by rotating said tool in engagement with the blank while imparting a relative generating movement between the tool and blank as though the blank were meshing with a basic gear represented by the tool, and in cutting the side tooth faces of the other member of the pair with a rotary annular face mill, provided with cutting edges adapted to finish cut opposite side tooth faces of the blank, whose diameter is different from the diameter of the first tool, by rotating the latter tool in engagement with the taper gear blank while imparting a relative generating movement between the latter tool and blank as though the blank were rolling with a basic gear represented by the latter tool.

26. The method of producing a pair of bevel gears which consists in cutting the side tooth surfaces of one member of the pair with a rotary annular face mill, provided with cutting edges adapted to finish cut opposite side tooth faces of the blank, by rotating said tool in engagement with a taper gear blank while imparting a relative generating movement between the tool and blank as though the blank were meshing with a basic gear represented by the tool, and in cutting the side tooth faces of the other member of the pair with a rotary annular face mill, having a different diameter from the first tool, by rotating the latter tool in engagement with a tapered gear blank while imparting a relative generating movement between the latter tool and blank as though the blank were meshing with a basic gear represented by the latter tool, the axis of the blank, during generation of one member of the pair, being maintained offset from the axis of the basic gear to which it is being generated conjugate.

27. The method of producing a pair of bevel gears which consists in cutting the side tooth surfaces of one member of the pair with a rotary annular face mill, provided with cutting edges adapted to cut opposite side tooth faces of the blank, by rotating said tool in engagement with a tapered gear blank while imparting a relative generating movement between the tool and blank corresponding to that of a gear meshing with a basic gear represented by the tool, and in cutting the side tooth surfaces of the other member of the pair with a rotary annular face mill, provided with cutting edges adapted to finish cut opposite side tooth faces of the blank, whose diameter is different from the diameter of the first tool, by rotating the latter tool in engagement with a tapered gear blank while imparting a relative generating movement between the latter tool and blank as though the blank were meshing with a basic gear represented by the latter tool, the axis of the blank, during generation of one member of the pair, being maintained offset from the axis of the basic gear to which it is generated conjugate.

28. The method of producing a pair of bevel gears which consists in cutting the side tooth surfaces of one member of the pair with a rotary annular face mill, provided with cutting edges adapted to finish cut opposite side tooth faces of the blank, by rotating the latter tool in engagement with a tapered gear blank while imparting a relative generating movement between the tool and blank as though the blank were meshing with a basic crown gear, represented by the tool, whose axis intersects the axis of the blank in its apex, and in cutting the side tooth surfaces of the other member of the pair with a rotary annular face mill, provided with cutting edges adapted to finish cut opposite side tooth faces of the blank, whose diameter is different from the diameter of the first named tool, by rotating the latter tool in engagement with a tapered gear blank while imparting a relative generating movement between the latter tool and blank as though the blank were meshing with a basic gear represented by the latter tool, whose axis is offset from the axis of the blank.

29. The method of producing a pair of bevel gears which consists in cutting the side tooth surfaces of one member of the pair two sides simultaneously by moving a pair of cutting edges, of circular arc profile, in separate concentrically curved paths across the face of a tapered gear blank while imparting a relative generating movement between the cutting edges and blank as though the blank were meshing with a basic gear represented by said cutting edges, and in cutting the side tooth faces of the other member of the pair two sides simultaneously with a pair of cutting edges, of circular arc profile, whose pressure angles are different from the pressure angles of the first pair of cutting edges, by moving the latter cutting edges in separate concentrically curved paths across the face of a tapered gear blank while imparting a relative generating movement between the latter cutting edges and blank as though the blank were meshing with a basic gear represented by the latter cutting edges.

30. The method of producing a pair of bevel gears which consists in cutting the side tooth faces of one member of the pair two sides simultaneously by moving a pair of cutting edges, of circular arc profile, in separate concentrically curved paths across the face of a tapered gear blank while imparting a relative generating movement between said cutting edges and blank as though the blank were meshing with a basic gear represented by said cutting edges, and in cutting the side tooth faces of the other member of the pair two sides simultaneously with a pair of cutting edges, of circular arc profile whose pressure angles are different from the pressure angles of the first pair of cutting edges, by moving the latter cutting edges in separate concentrically curved paths across the face of a tapered gear blank while imparting a relative generating movement between the latter cutting edges and blank in the manner of a gear meshing with a basic gear, represented by the latter cutting edges, whose axis is offset from the axis of the blank.

31. The method of producing a pair of bevel gears which consists in cutting the side tooth surfaces of one member of the pair two sides simultaneously with a rotary annular face mill, having cutting edges of circular arc profile which are adapted to cut opposite side tooth faces of the blank, by rotating said tool in engagement with a tapered gear blank while imparting a relative generating movement between the tool and blank as though the blank were meshing with a basic gear, represented by the tool, and in cutting the side tooth faces of the other member of the pair two sides simultaneously with a rotary annular face mill, having cutting edges of circular arc profile which are adapted to cut opposite side tooth faces of a blank, the latter tool being of different diameter from the first tool, by rotating the latter tool in engagement with a tapered gear blank while imparting a relative generating movement between the latter tool and blank as though the blank were meshing with a basic gear, represented by the latter tool.

32. The method of producing a pair of bevel gears which consists in cutting the side tooth faces of one member of the pair two sides simultaneously with a rotary annular face mill, having cutting edges of circular arc profile which are adapted to cut opposite side tooth faces of a blank, by rotating said tool in engagement with a tapered gear blank while imparting a relative generating movement between the tool and blank as though the blank were rolling with a basic gear, represented by the tool, whose axis intersects the blank axis in its apex, and in cutting the side tooth faces of the other member of the pair two sides simultaneously with a rotary annular face mill whose diameter is different from the diameter of the first tool, the latter tool having cutting edges of circular arc profile which are adapted to finish cut opposite side tooth faces of a blank, by rotating the latter tool in engagement with a tapered gear blank while imparting a relative generating movement between the latter tool and blank as though the blank were meshing with a basic gear, represented by the latter tool, whose axis is offset from the axis of the blank.

ERNEST WILDHABER.